United States Patent

Mezzedimi et al.

Patent Number: 5,207,291
Date of Patent: May 4, 1993

[54] BARRIER SYSTEM FOR THE LUBRICATING OIL FOR THE BEARINGS OF A CENTRIFUGAL COMPRESSOR WITH LABYRINTH SEALS INSTALLED IN A CONFINED ENVIRONMENT

[75] Inventors: Vasco Mezzedimi, Poggibonsi; Giampietro F. Aggradi, Florence, both of Italy

[73] Assignee: Nuovopignone-Industrie Meccaniche e Fonderia S.p.A., Florence, Italy

[21] Appl. No.: 862,229

[22] Filed: Apr. 2, 1992

[30] Foreign Application Priority Data

Apr. 11, 1991 [IT] Italy .................. MI91 A/000991

[51] Int. Cl.$^5$ .................................................. F01M 1/00
[52] U.S. Cl. .................................. 184/6.16; 184/6.27; 277/13; 277/53; 384/135; 384/465; 384/472
[58] Field of Search ............... 184/6.16, 6.27, 6.11; 384/135, 465, 472; 415/171.1, 110, 111, 112, 113; 60/39.08; 417/423.12, 423.13; 277/13, 14 R, 14 V, 25, 53

[56] References Cited

U.S. PATENT DOCUMENTS

| | | | |
|---|---|---|---|
| 1,413,425 | 4/1922 | Rice | 384/135 |
| 1,784,104 | 2/1926 | Masterson et al. | 277/13 |
| 2,133,879 | 10/1938 | Thearle | 277/14 |
| 2,711,332 | 6/1955 | Audemar | 415/171.1 |
| 2,823,052 | 2/1958 | Collman | 277/13 |
| 3,685,617 | 8/1972 | Gardner | 184/6.16 |
| 3,765,688 | 10/1973 | Junker | 277/14 |
| 4,265,456 | 5/1981 | Atkin | 415/111 |
| 4,335,885 | 6/1982 | Heshmat | 277/13 |
| 4,455,026 | 6/1984 | Pinkus et al. | 277/13 |
| 4,477,223 | 10/1984 | Giroux | 415/110 |

FOREIGN PATENT DOCUMENTS 946424  5/1947  France.

Primary Examiner—Richard R. Cole
Assistant Examiner—Alan B. Cariaso
Attorney, Agent, or Firm—Morgan & Finnegan

[57] ABSTRACT

A barrier system for the lubricating oil for the bearings of a centrifugal compressor with labyrinth seals installed in a confined environment, consisting of a disc concentrically rigid with the rotating compressor shaft in the chamber facing the bearing situated on the compressor suction side, in a position between said bearing and the relative suction side labyrinth seal, the disc having an inverted U-shaped rim housing a stator ring rigid with the wall of said chamber and arranged concentric with said shaft, which with said rotating disc forms a small passage continuously fed, and kept filled by the centrifugal effect of said rotating disc, with barrier oil bled from the lubricating oil feed, said stator ring being provided, on that side facing the disc, with a wedge which is inserted into a corresponding cavity in the disc, and with an annular deflector tooth projecting beyond the outer edge of said disc cavity.

1 Claim, 2 Drawing Sheets

BARRIER SYSTEM FOR THE LUBRICATING OIL FOR THE BEARINGS OF A CENTRIFUGAL COMPRESSOR WITH LABYRINTH SEALS INSTALLED IN A CONFINED ENVIRONMENT

FIELD OF THE INVENTION

This invention relates to a new barrier system which by effectively blocking, at low cost and with minimum dissipated power, any circulation of gas and oil vapour from the relative sealed collection vessel, through the labyrinth seal and towards the compressor suction side, ie towards the first stage impeller of said compressor, and hence preventing any loss of oil, enables the compressor to be advantageously used in a confined environment, i.e., in an environment not in contact with atmosphere, such as the sea bed, especially when because of lack of space said vessel has to be located very close to the compressor.

More specifically, the invention relates to an improvement in the system of our previous U.S. patent application Ser. No. 07/823,868 filed on Jan. 22, 1992.

BACKGROUND OF THE INVENTION

In said patent application, the deleterious gas stream which could arise via the sealed lubricating oil collection vessel between the chamber of the bearing on the compressor delivery side, which is at the highest pressure, and the chamber of the bearing on the compressor suction side, which is at the lowest pressure, and could entrain oil vapour and droplets through the labyrinth seal and towards the impeller of the first compressor stage with a consequently unacceptable loss of lubricating oil, is compensated by including in the discharge pipe to the vessel from said chamber on the compressor suction side a dynamic barrier of liquid ring type which allows the lubricating oil to pass by gravity but prevents passage of any gas or vapour in the opposite direction.

More specifically, said dynamic barrier consists of a disc rotating within a toroidal stator part which with the disc forms a small passage which remains always filled with barrier oil by the centrifugal effect of the rotating disc.

Although this solution is highly effective as a barrier, it suffers from a series of drawbacks such as a certain constructional complexity and cost due to the need for an auxiliary motor for driving the disc, and a high dissipated power because the entire quantity of oil necessary for lubricating the bearing on the compressor suction side has to pass through the passage between the rotating disc and the toroidal stator part.

OBJECTS AND SUMMARY OF THE INVENTION

The object of the present invention is to obviate said drawbacks by providing a barrier system which does not require a motor and uses only a minimum quantity of barrier oil.

This is attained by positioning the barrier not in the discharge pipe to the vessel from the chamber on the compressor suction side but in the chamber itself, between the bearing and the labyrinth seal on the suction side, and forming the barrier system with a disc rigid concentrically with the rotating shaft of the compressor and comprising an inverted U-shaped rim housing a stator ring rigid with the wall of the bearing chamber on the suction side and arranged concentric with said shaft, which with said disc forms a small passage continuously fed with oil at barrier pressure through sized holes in said ring.

In this manner, the presence of the small passage subjected to centrifugal force consequent on the rotation of said disc rigid with the shaft, which maintains said passage always filled with barrier oil, effectively separates the bearing chamber on the compressor suction side from the labyrinth seal zone on the compressor suction side, hence preventing any circulation of gas and lubricating oil vapour from said chamber to the impeller of the first compressor stage and consequently any loss of lubricating oil, even though with the compressor in a confined environment the pressure in said chamber is higher than that in the first impeller zone in that, as is well known, said chamber is connected to the bearing chamber on the compressor delivery side via the discharge pipes and the sealed collection vessel roof. The necessary barrier oil flow rate through said passage is now only the minimum required to prevent overheating of the passage caused by the viscosity of the oil moved by the rotating disc.

In this respect, to prevent undesirable loss of said barrier oil and hence maintain the required flow rate low, according to a further characteristic of the present invention said stator ring is provided, on that side facing said disc, with a wedge which is inserted into a corresponding cavity in said disc, and with an annular deflector tooth projecting beyond the outer edge of said disc cavity.

In this manner a kind of labyrinth is created which prevents the barrier oil flowing into the interspace between the shaft and the stator ring.

Hence, the barrier system for the lubricating oil for the bearings of a centrifugal compressor with labyrinth seals installed in a confined environment and comprising one or more impellers mounted on a shaft rotating at high speed on said bearings and a pump which withdraws the lubricating oil for said bearings from a sealed collection vessel and feeds it under pressure respectively to a chamber facing the bearing situated on the compressor suction side upstream of the suction side labyrinth seal and to a chamber facing the bearing situated on the compressor delivery side downstream of the delivery side labyrinth seal, from which the oil is discharged by gravity through separate pipes respectively connecting said chambers to the roof of said sealed collection vessel, is characterised according to the present invention in that in said chamber facing the bearing situated on the compressor suction side, in a position between the bearing and said suction side labyrinth seal, there is provided concentrically rigid with the rotating compressor shaft a disc having an inverted U-shaped rim housing a stator ring rigid with the wall of said chamber and arranged concentric with said shaft, which with said rotating disc forms a small passage continuously fed through sized holes in said ring, and kept filled by the centrifugal effect of said rotating disc, with barrier oil bled from the pipe through which lubricating oil is fed under pressure to said chamber, said stator ring being provided, on that side facing said rotating disc, with a wedge which is inserted into a corresponding cavity in said disc, and with an annular deflector tooth projecting beyond the outer edge of said disc cavity.

The invention is further described hereinafter with reference to the accompanying drawings which show a preferred embodiment thereof by way of non-limiting example in that technical or constructional modifications can be made thereto but without leaving the scope of the present invention.

In said drawings:

BRIEF DESCRIPTION OF THE DRAWINGS

FIG. 2 is a very enlarged sectional front view of a detail of

FIG. 1, showing the barrier system of the invention.

DETAILED DESCRIPTION OF THE INVENTION

Figure 1:
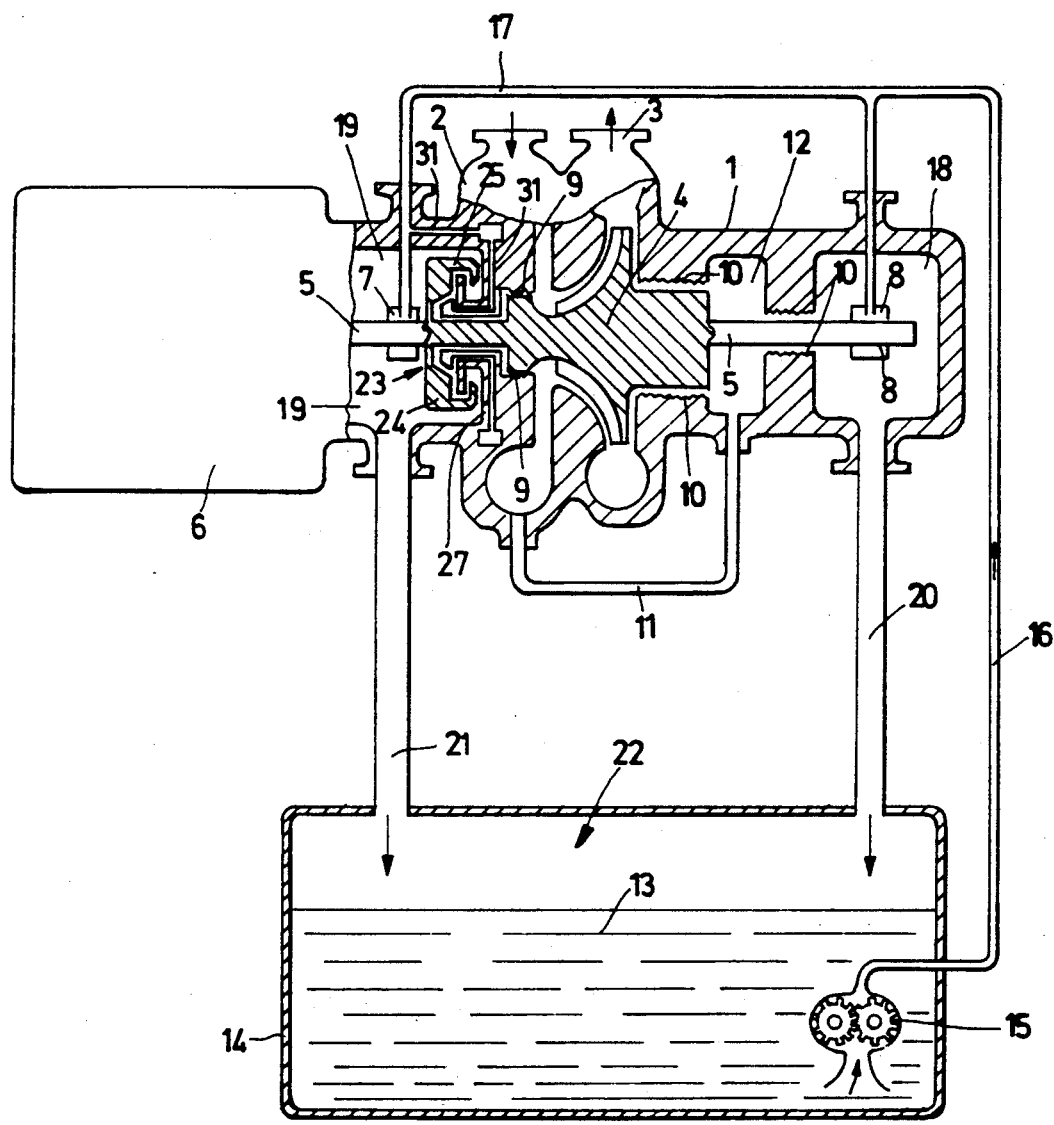
FIG. 1 is a partly sectional front view of a centrifugal compressor with labyrinth seals, using the barrier system for the bearing lubricating oil formed in accordance with the invention.
Figure 2:
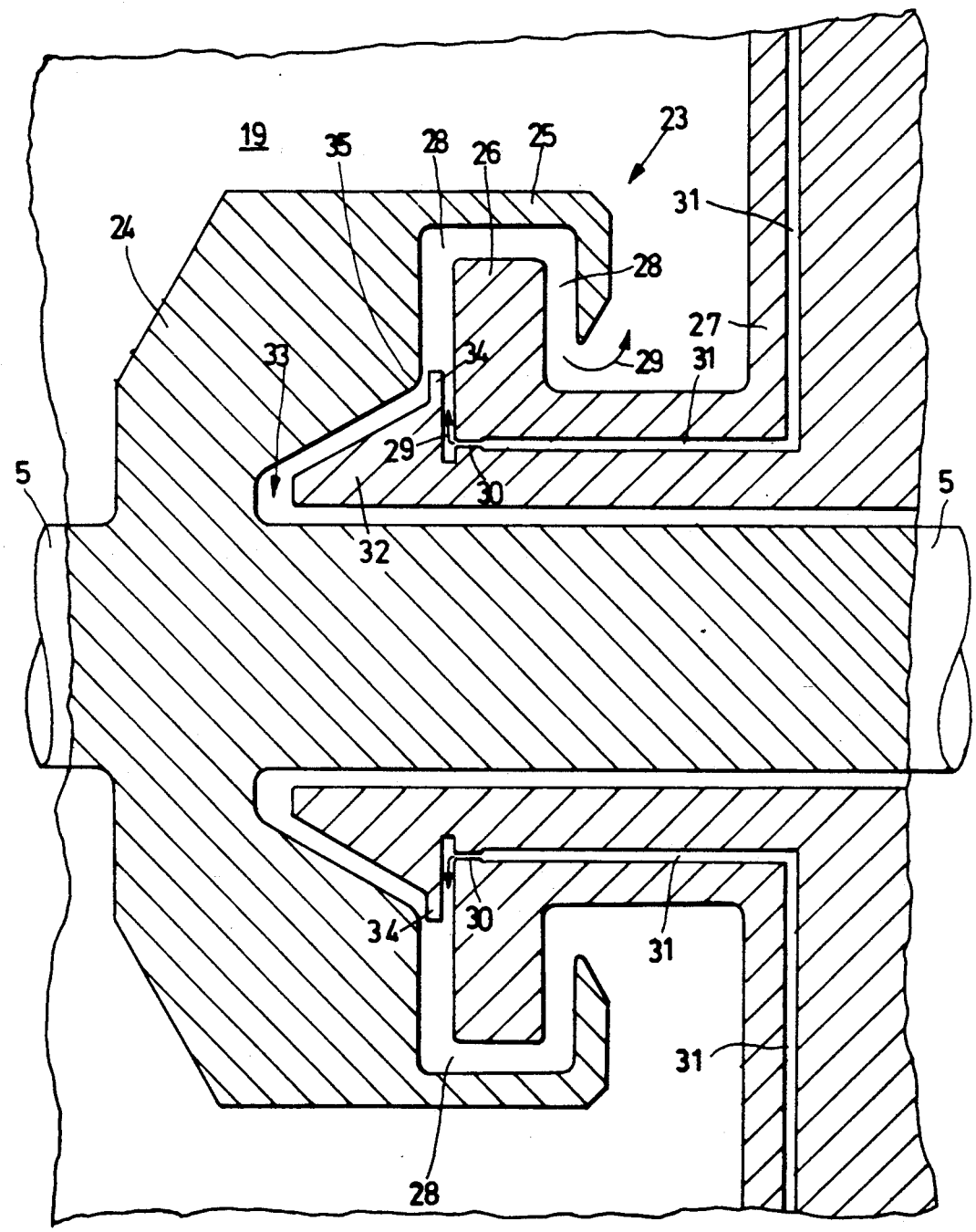

In the figures, the reference numeral 1 indicates a centrifugal compressor in which the process gas, entering through the suction duct 2 and leaving through the delivery duct 3, is compressed by the blades of an impeller 4 mounted on the shaft 5, which is rotated at high speed by a motor 6 on bearings 7 and 8 located respectively on the suction side and on the delivery side of the compression zone of the compressor 1, delimited by labyrinth seals 9 and 10 respectively. FIG. 1 also shows the duct 11 by which the compressor suction pressure is transmitted to the chamber 12 downstream of the impeller 4.

Said bearings 7 and 8 are continuously lubricated by the lubricating oil 13 contained in a sealed collection vessel 14 from which it is withdrawn by a pump 15 which, via the pipes 16 and 17, feeds it respectively into a chamber 18 facing said bearing 8 situated on the compressor delivery side and into a chamber 19 facing said bearing 7 situated on the compressor suction side. The oil then flows out of said chambers 18 and 19 by gravity and through the separate pipes 20 and 21 respectively, which connect said chambers to the top or roof 22 of the sealed vessel 14. The dynamic barrier system 23 of the invention is arranged in said chamber 19, between the bearing 7 and the labyrinth seal 9. Said system 23 consists of a disc 24 concentrically rigid with the shaft 5 of the compressor 1, said disc having an inverted U-shaped rim 25 in which there is inserted a stator ring 26 rigid with the wall 27 of said chamber 19 and arranged concentric with said shaft 5.

Said stator ring 26 hence forms with the rotating disc 24 a small passage 28 continuously fed in the direction of the arrows 29 through sized holes 30 with barrier oil bled from said pipe 17 via the branch 31.

Finally, said stator ring 26 is provided, on that side facing the rotating disc 24, with a wedge 32 which is inserted into a corresponding cavity 33 formed in the rotating disc 24, and with an annular deflector tooth 34 which projects beyond and hence surpasses the outer annular edge 35 of said cavity 33.

We claim:

1. A barrier system for lubricating oil for bearings of a centrifugal compressor comprising a compressor having a suction side and delivery side, labyrinth seals defining a compression zone therebetween for at least one impeller, said impeller being mounted on a shaft for rotation at high speed on bearings, a pump which withdraws the lubricating oil for said bearings from a sealed collection vessel and feeds it under pressure through a feed pipe respectively to a first chamber containing one of said bearings and to a second chamber containing another of said bearings, said labyrinth seals, impeller and compression zone being located between said first and second chambers, with said first chamber being on the suction side, and said second chamber being on the delivery side, separate pipes respectively connecting said first and second chambers to a roof of said sealed collection vessel to discharge oil by gravity from said first and second chamber, a disc having an inverted U-shaped rim housing a stator ring rigid with a wall of said first chamber and arranged concentric with said shaft, said disc being concentrically rigid with respect to said shaft, said rotating disc and said stator forming a small passage continuously fed through sized holes in said ring, and kept filled by the centrifugal effect of said rotating disc, with barrier oil bled from a branch pipe of said feed pipe through which lubricating oil is fed under pressure to said first chamber, said stator ring being provided, on a side facing said rotating disc, with a wedge which is inserted into a corresponding cavity in said disc, and with an annular deflector tooth projecting beyond an outer edge of said disc cavity.

* * * * *